Oct. 3, 1961 — R. W. GARBER — 3,002,656
SPREADER WITH SLIDE MEMBER
Filed Feb. 4, 1960 — 3 Sheets-Sheet 1

INVENTOR.
ROY W. GARBER.
BY
ATTORNEY

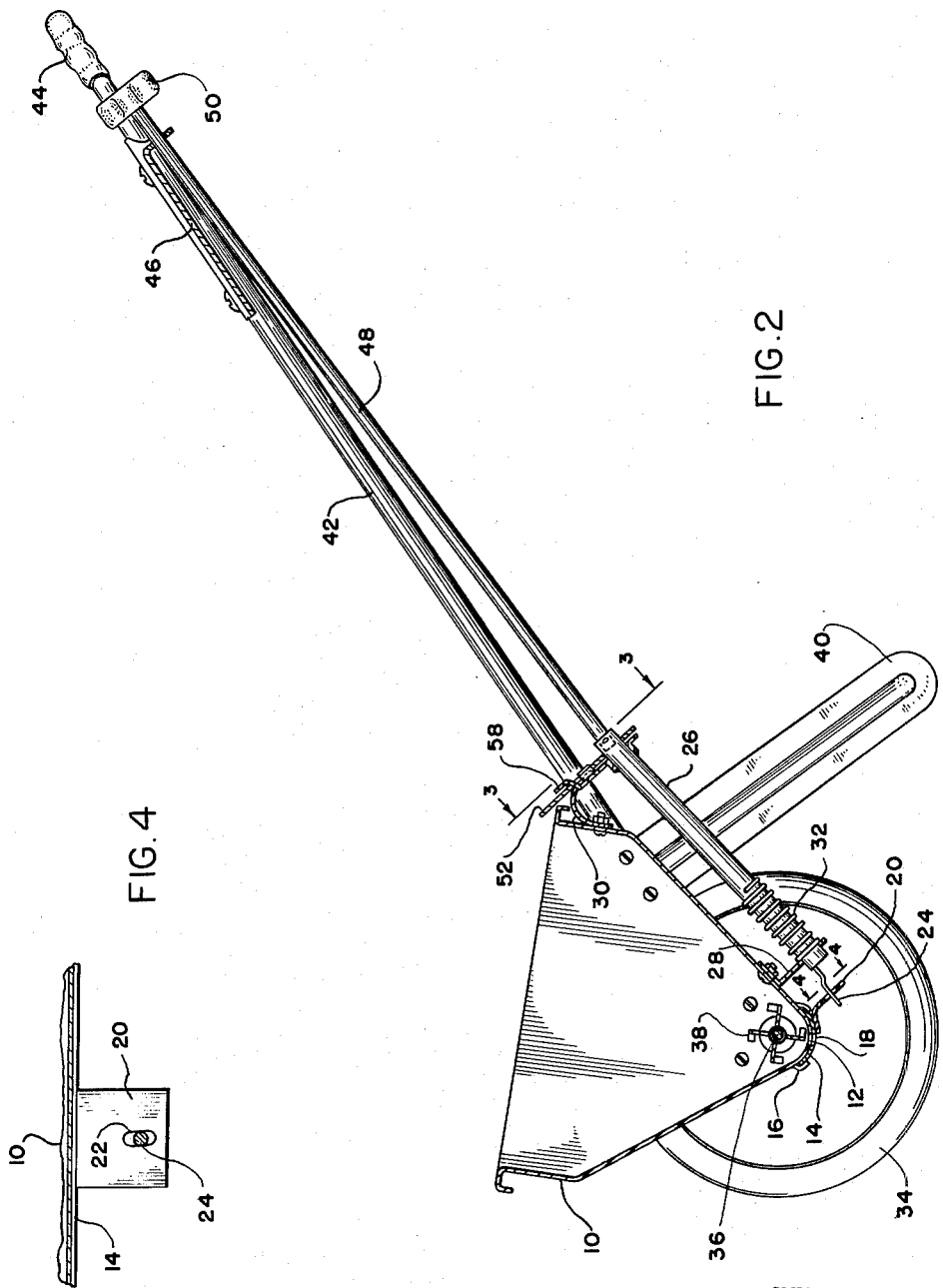

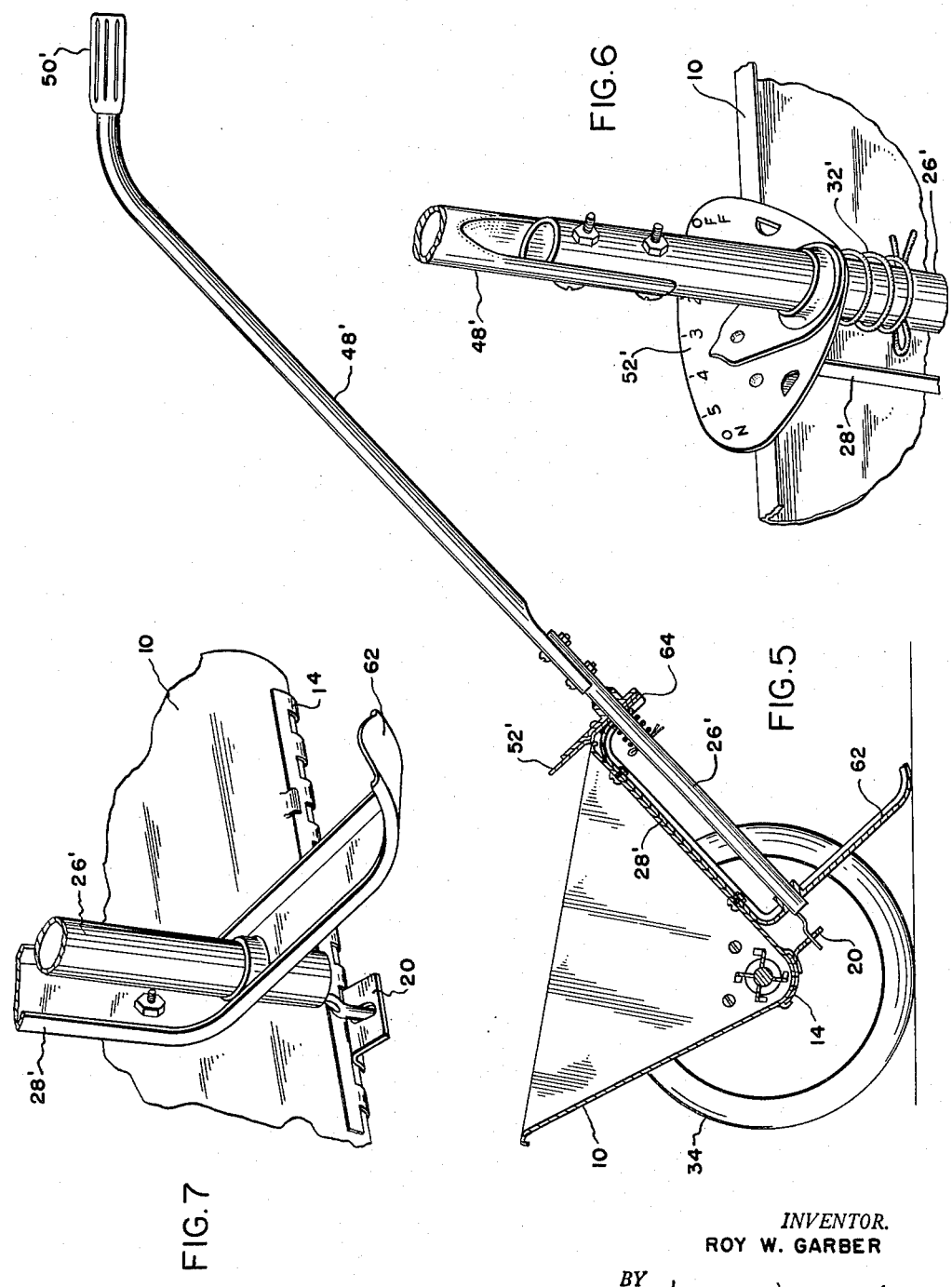

United States Patent Office 3,002,656
Patented Oct. 3, 1961

3,002,656
SPREADER WITH SLIDE MEMBER
Roy W. Garber, Elizabethtown, Pa., assignor to Moto-Mower, Inc., Oak Park, Mich., a corporation of Delaware
Filed Feb. 4, 1960, Ser. No. 6,718
2 Claims. (Cl. 222—43)

This invention relates to spreaders of the type adapted to be used for distributing seed, fertilizer, or the like on the ground.

The principal object of the invention is to provide an improved spreader which embodies means for varying the amount of material released and positive, fast acting, cut-off means operable to stop flow of material from the spreader hopper when desired.

Another object is to provide an improved spreader of simple and economical construction having simple, positively acting means for varying the flow of material from the hopper.

Other objects and advantages of the invention will become apparent from the following description which, taken in conjunction with the accompanying drawings, illustrates preferred embodiments of the invention.

In the drawings:

FIG. 2 is a vertical section of the spreader on an enlarged scale;

FIG. 4 is a detail of the flow regulating slide actuating means taken as indicated by the line 4—4 on FIG. 2.

FIG. 5 is a side view, partially in section of a modified form of spreader;

FIG. 6 is an enlarged detail of the gauge plate and associated parts of the FIG. 5 spreader; and FIG. 7 is an enlarged detail of the flow regulating means.

Figure 1:
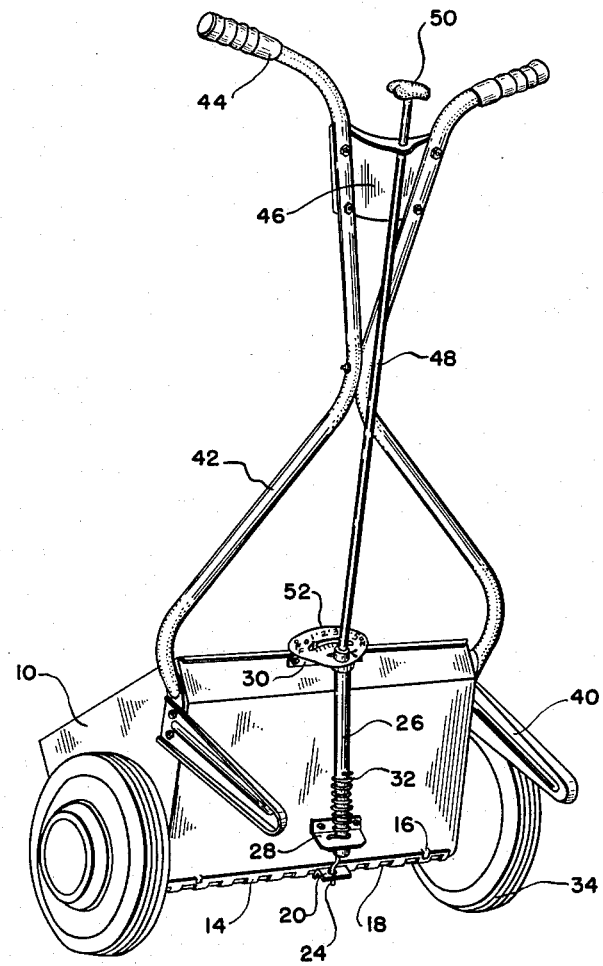
FIG. 1 is a perspective view of the spreader as viewed from the rear.

Referring now to FIGS. 1–4 inclusive, it may be seen that the device comprises a hopper 10 of sheet metal, plastic or the like having front and rear sloping walls inclined to provide a relatively wide-mouthed, upwardly presenting bin. The hopper is closed at the ends with vertical walls suitably attached to the front-rear wall structure which is preferably but not necessarily formed of one piece of material bent to U-shape.

The bottom of the hopper is provided with a series of spaced openings 12 through which the material being spread falls by gravity. A slide member 14 formed to complement the bottom shape of the hopper is slidably mounted on the hopper by means of clips 16 which are welded or otherwise secured to the hopper front and rear walls. The slide has holes 18 which are adapted to register with the openings 12, or to cover them or to provide openings smaller than the openings 12 in accordance with the position of the slide.

The slide is actuated by means of a lug 20 attached thereto. The lug has a slot 22 which receives a pin 24 carried by a torsion tube 26 and disposed axially eccentrically relatively thereto. The tube 26 is rotatably mounted in brackets 28—30 carried by the rear wall of the hopper. A torsion spring 32 has one end secured to the tube and its other end secured to the bracket 28, and acts to urge the slide 14 to a position closing the openings 12.

The hopper is supported on wheels 34 which are mounted on a live axle 36. The axle extends through the hopper and the portion inside the hopper carries an agitator 38 which turns with the axle and agitates the material as is well known in the art.

A pair of legs 40 suitably fastened to the hopper end walls provide a rest for the spreader when not in use.

A handle structure 42 having the usual grips 44 is attached also to the end walls and carries a bracket 46 which mounts a flow control tube 48 which has a knob 50 on its upper end. The tube 48 is operatively connected to the torsion tube 26 as shown.

The bracket 30 is preferably a two-piece bracket and embodies a gauge plate 52. The gauge plate has an arcuate slot 54 (FIG. 3) in its planar surface and adjacent to the slot a plurality of integral, angularly disposed fingers 56.

Figure 3:
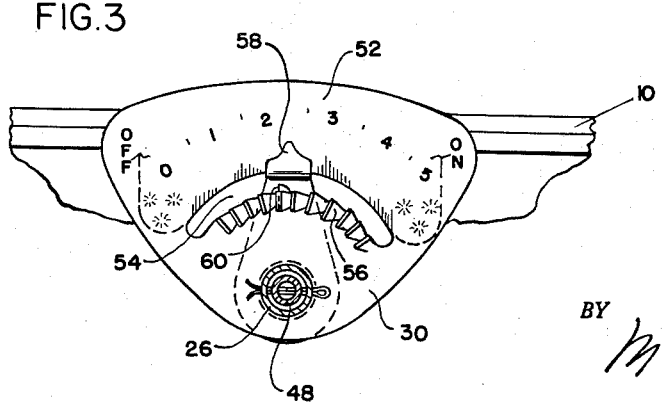
FIG. 3 is an enlarged detail of the gauge plate and flow regulating means taken as indicated by the line 3—3 on FIG. 2.

Rigidly attached to the tube 26 is an indicator 58. The latter is of substantially S-shape and has an upwardly and forwardly bent portion which extends through the slot 54 and which indicates the degree of opening of the slide holes as can be readily understood. The indicator 58 has a pressed out stop 60 disposed in such position that it engages the underside of the fingers 56 (FIGS. 2 and 3). The torsion spring 32, in addition to urging the tube 26 to closed position of slide 14, also urges tube 26 upwardly such that the stop 60 is in releasable engagement with the fingers 56.

It may be seen then that with the slide 14 in closed position, the hopper 10 may be filled with seed, fertilizer or other material of such composition that it will pass through openings 12 and the spreader may be wheeled to the point of use. By turning the knob 50 clockwise, the slide 14 is moved to bring holes 18 thereof into full or partial registry with the openngs 12. Pushing of the spreader then will cause the material to drop through the openings 12, the agitator 38 functioning to prevent clogging and giving even distribution.

When the user comes to a turn or to the end of the path, a push on the knob 50 will depress the tubes 48 and 26 downwardly thereby disengaging the stop 60 from the fingers 56 and permitting the spring 32 to snap the slide 14 to closed position. When a new direction of traverse is resumed, the knob 50 is rotated to provide the same degree of opening as indicated by the numbers on the gauge plate.

The feature just described, i.e. the quick closing of the slide in response to a push or blow on the knob 50, is of extreme importance to the improved operation of the spreader because it prevents overrun and unevenness of distribution, as well as waste of material. This feature is especially useful when spreading grass seed or fertilizer as it makes possible quick and easy cut-off of the distribution of material when at the end of a traverse and thus prevents over-sowing or over-fertilization at turning points with consequent uneven growth.

FIGS. 5–7 inclusive show a modified form of spreader of still simpler construction, but lacking the quick cut-off means.

In this form, the tube 48' constitutes both the handle and the flow adjusting means. The tube 48' is bolted to a tube 26' which is rotatably carried in a bracket 28', the latter having a lower angular portion 62 which serves as a rest for the sperader when not in use, and an upper angular portion 64 which mounts the gauge plate 52'. The gauge plate 52' is fixed to the bracket 28' and spring 32' is a compression spring only and functions to retain the parts in assembly and to releaseably lock the indicator 58' in selected position with respect to the gauge plate.

When the knob 50' is in straight position, the slide is closed. It may be opened by turning the tube 48' counter clockwise, as will be understood from the drawing.

I claim:

1. A spreader or the like comprising a hopper having front, rear and end walls, the front and rear walls diverging upwardly, a plurality of discharge openings in the bottom of the hopper, a slide member movably mounted adjacent said openings and operable to open or close the same, a tube mounted on the rear wall of the hopper, means interconnecting said tube and slide member whereby rotation of said tube causes movement of said slide member, a gauge plate mounted on said hopper, an indicator carried by said tube and operatively associated with said gauge plate for indicating the position of said slide member, said gauge plate being provided with a slot receiving said indicator and a plurality of integral, angularly disposed fingers, a stop on said indicator in engagement with said fingers and a combined torsion and compression spring carried by said tube for urging said indicator into engagement with said fingers and said tube to a slide-closing position.

2. In a wheeled spreader having a hopper and material distributing openings in the bottom thereof, a slide for opening and closing said openings, a rotatable member operatively connected with said slide for actuating the same, means for releasably locking said rotatable member in selected rotative positions to provide selective feed from said hopper, a spring operatively connected with said member for urging said member axially upwardly and to a rotative position closing said slide, and a manually operable member connected with said rotatable member for moving said rotatable member axially downwardly whereby said spring will snap said rotatable member to slide closing position in response to axial downward movement of said member.

References Cited in the file of this patent

UNITED STATES PATENTS

| | | |
|---|---|---|
| 2,778,535 | Seltzer | Jan. 22, 1957 |
| 2,812,108 | Chatfield | Nov. 5, 1957 |
| 2,892,571 | Christenson et al. | June 30, 1959 |